Dec. 27, 1938. A. KÄRCHER Re. 20,954
IMMERSION HEATER FOR BATHS
Original Filed Sept. 3, 1935 3 Sheets-Sheet 1
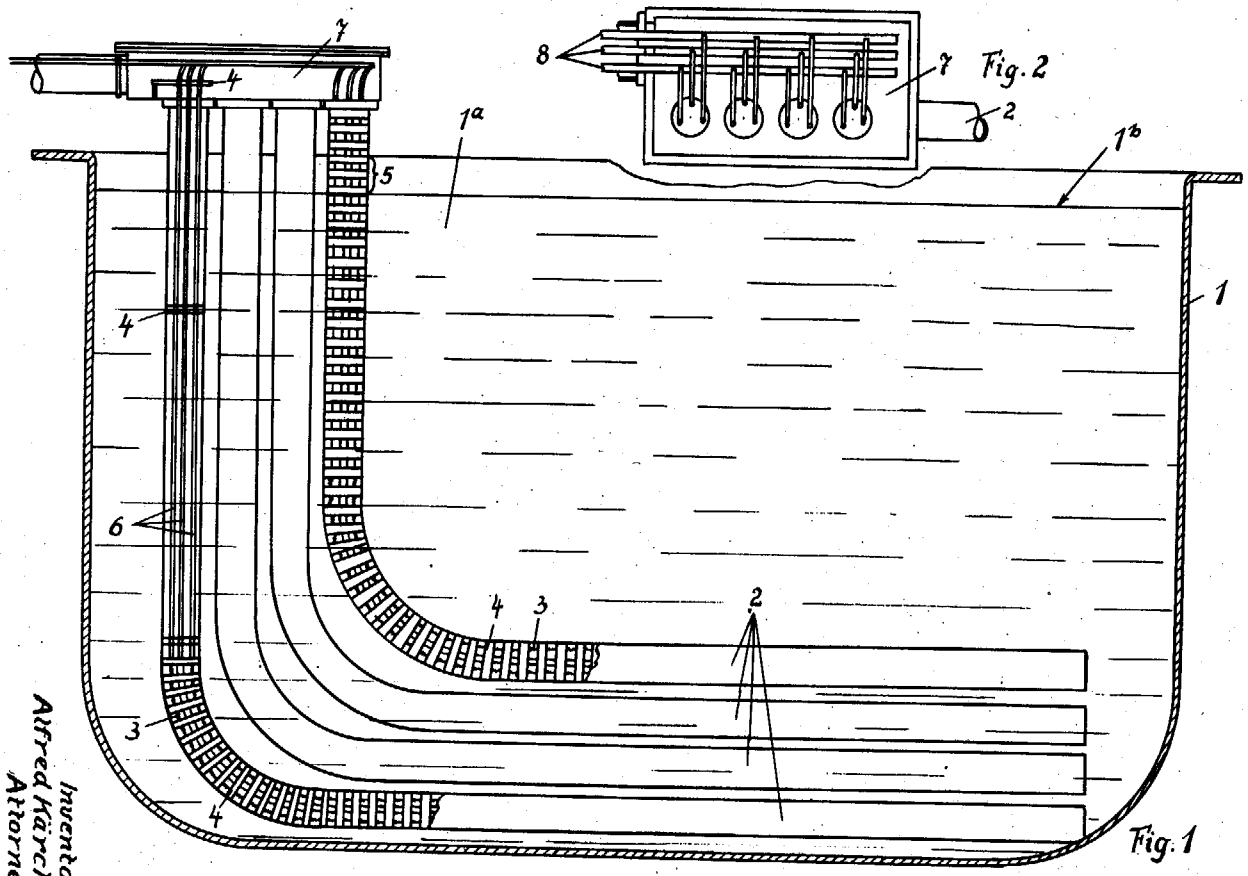
Inventor:
Alfred Kärcher
Attorneys:
Bailey & Carson Dec. 27, 1938. A. KÄRCHER Re. 20,954
IMMERSION HEATER FOR BATHS
Original Filed Sept. 3, 1935 3 Sheets-Sheet 2
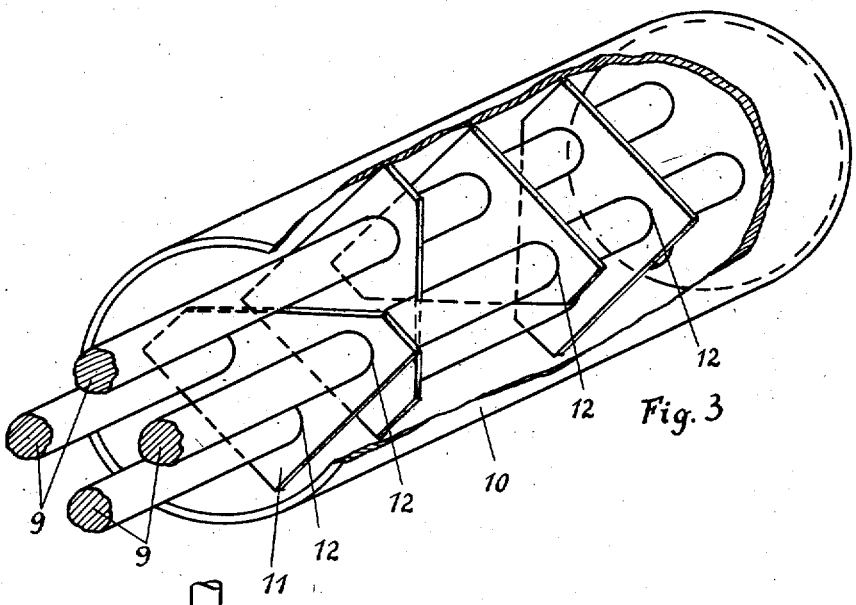
Fig. 3
Fig. 7
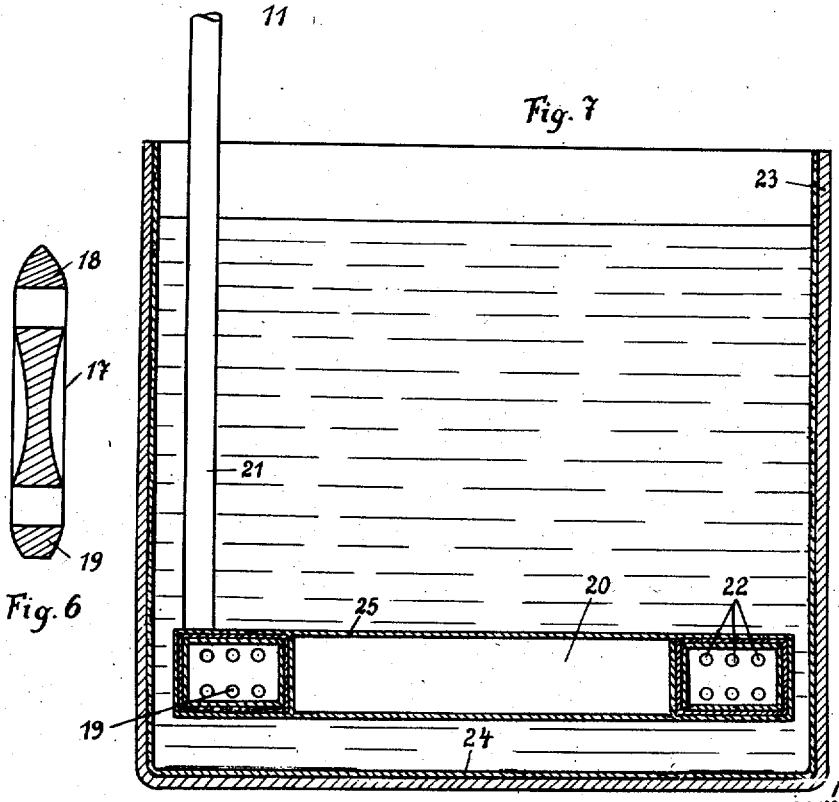
Fig. 6
Inventor
Alfred Kärcher
Attorneys
Bailey & Carson Dec. 27, 1938. A. KÄRCHER Re. 20,954

IMMERSION HEATER FOR BATHS

Original Filed Sept. 3, 1935 3 Sheets-Sheet 3

Inventor:
Alfred Kärcher
Attorneys:
Bailey & Carson

Reissued Dec. 27, 1938

Re. 20,954

UNITED STATES PATENT OFFICE 20,954

IMMERSION HEATER FOR BATHS

Alfred Kärcher, Stuttgart-Cannstatt, Germany, assignor to the firm Deutsche Gold- und Silber-Scheideanstalt vormals Roessler, Frankfort-on-the-Main, Germany, a corporation of Germany Original No. 2,097,981, dated November 2, 1937, Serial No. 39,030, September 3, 1935. Application for reissue May 4, 1938, Serial No. 206,085. In Germany September 3, 1934

16 Claims. (Cl. 219—41)

This invention is directed to heating elements adapted to be immersed in baths for the heating thereof. The invention is particularly adapted to be used for heating salt baths which baths have a very corrosive action upon the heating elements used therewith. This invention is a reissue of my patent, No, 2,097,981, of November 2, 1937, It is common to heat liquids, especially liquids such as water, oils and salt baths, by means of electrical resistance units which are inserted within tubes extending through the liquid. These heating elements have not, however, proved successful as they must be replaced after some use. Especially in connection with the salt baths the heating elements of the prior art were not commercially practical because the hot salt baths have a very corrosive action upon the heating elements and in time will short-circuit the electrical heating resistance. In the prior art the changing or the replacing of the heating resistance which has been destroyed by the corrosion action of the bath has been a very difficult and dangerous matter, and at the best the heating resistance could not be changed without allowing the bath to cool to a critical degree.

It is therefore an object of my invention to construct an electrical resistance unit which may be used in a salt bath without being readily subjected to the corrosion action of the bath.

A further object of my invention is to construct an electrical resistance unit which may be very easily replaced within a curved tube and which may be used to heat any type of bath.

A further object of my invention is to create a flexible electrical resistance supported by suitable insulating elements which may be readily inserted and withdrawn from a curved protecting tube.

These objects of my invention are obtained in general by constructing a curved tubular member adapted to be immersed in the bath and said tubular member being sealed at its immersed end. Preferably, a seamless tube is used and the sealed end is constructed with a minimum amount of welding in order to make the tube as impervious as possible to the corrosive salts encountered in salt baths. Interiorly of this tube a heating resistance is placed, which resistance consists of a conductor or conductors extending through a plurality of spaced insulating members. These insulating members are spaced in order to give flexibility to the plurality of conductors and the insulating elements are constructed so as to give a minimum of bearing surface against the interior walls of the tube. By reason of the flexibility of this construction, the heating resistance can be readily inserted and withdrawn from the tube. Should the heating resistance become damaged, it can be exchanged for a new heating resistance within a very short time and with only a momentary interruption of the heating of the bath whereby the temperature of the bath may be maintained substantially constant.

The short circuiting of a heating element in a salt bath is caused by the infiltration of the salt through the walls of the tube, and a concentration of the salt adjacent the insulating elements which hold the conductors in the tube. A building up of these salts through continued use finally causes a contact to be made between the various conductors and a consequent short circuiting of the conductors. This difficulty is substantially entirely avoided or at least greatly mitigated by making the insulating elements, which hold the conductors, of flat shape and spaced from one another so that a substantial amount of salt can enter between the insulators before the conductors themselves are reached by the salts. Furthermore, inasmuch as the salt concentrations take place at the points of contact between the insulators and the walls of the tube, the insulators are made with as small bearing areas against the tube as possible in order to keep down the concentration of the salts.

The above construction has further advantages in that the point-like contacts maintained between the insulators and the interior wall of the tube create very little friction when the heating resistance is being moved within the tube. Therefore, the insulator may be easily inserted into and withdrawn from the tube.

A further advantage of the construction lies in the fact that the insulating elements are spaced from one another and expose to the walls of the tube a substantially greater area of the heating conductors themselves. Consequently, a greater degree of heating of the walls of the tube and of the bath is obtained than was obtained in the constructions found in the prior art.

A further advantage of the use and construction lies in the fact that the flexibility and ease of insertion and withdrawal of the heating resistance allows tubes to be used which are bent at sharper angles than which were practically used in the prior art.

The structures by which I am able to obtain these advantages of my invention are more particularly disclosed in the following specification, taken in connection with the accompanying drawings:

Fig. 1 is a cross-sectional view of a salt bath having several heating bodies immersed therein.

Fig. 2 is a partial plan view of the portion of heating elements extending above the bath.

Fig. 3 is a perspective view partially shown in section of a plurality of conductors held in spaced relation with respect to each other and to the walls of the pipe by means of space insulating elements.

Fig. 6 shows a modified form of the insulating element shown in Fig. 1, and

Fig. 7 is a cross-sectional view of a bath showing the arrangement of a plurality of heating elements therein.

Figure 4:
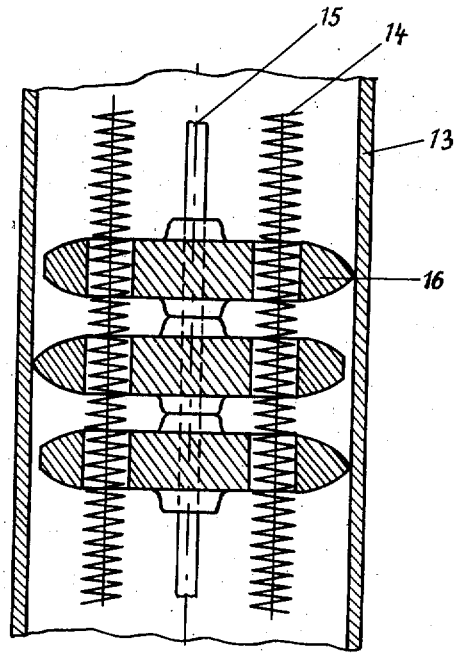
Fig. 4 is a cross-sectional view through a protecting pipe and the heating element contained therein.

In Fig. 1 the bath reservoir 1 containing a salt bath 1*a* which rises to the height 1*b* in the tank has therein a plurality of heating bodies 2. Each of these heating bodies consists of a horizontal portion and a vertical portion connected by a curved section to the horizontal portion. This curved portion is such that a heating element or a heating resistance element may be inserted into the tube. The two pipes 2 are shown partially in section. In the upper pipe the insulating elements are carried above the surface 1*b* of the salt bath 1*a* whereas in the lower pipe the insulating elements extend only slightly above the curved section of the pipe. In the upper pipe the entire conductors are formed by spiral wires 3 held spaced from one another and to the pipe 2 by means of insulating elements 4 of ceramic material. In the lowest tube shown in Fig. 1 the spiral wires 3 are only continued around the curve of the pipe 2 and then are joined to metal rods 6 which are extended up above the surface 1*b* of the bath. These metal rods 6 are held in spaced relation by means of one or two spaced insulating elements 4. The spiral resistance elements 3 are of course held in spaced relation by a plurality of spaced insulating elements 4. By means of this construction numerous insulating elements in the vertical portion of the tube 2 are dispensed with as is obvious from a comparison of the two tubes shown in section of Fig. 1. Consequently, the deposition of salts adjacent the insulators 4 in the left hand tube of Fig. 1 is considerably lessened over that of the right hand tube shown in section.

Above the surface 1*b* of the salt bath the open ends of the pipes 2 are closed by a casing 7 which also supports the current supply bars 8.

In Fig. 3 a plurality of conductors are shown held in spaced relation to each other and to the wall of the tube by means of insulating elements. The conductors 9 may be in the form of wire spirals and are supported from the walls of the pipe 10 by means of the flat spaced insulating elements 11. Each of these insulating elements 11 consists of a flat quadrangular plate having one corner cut off. As shown in the drawings the cut off corners of successive insulating elements are angularly displaced with respect to each other so that the cut off corners of a plurality of the elements in effect form a spiral. It is further noted that because of these cut off corners each insulating element 11 supports but three of the conductors 9, and that the fourth conductor is supported by adjacent insulating elements 11 which as stated before have their cut corners angularly displaced with respect to the preceding or succeeding insulating element. This arrangement has the advantage of reducing the friction between the insulating elements and the wall of the pipe 11 and further allowing a greater degree of direct radiation from the heating element 9 to the wall of the pipe 10.

Figure 5:
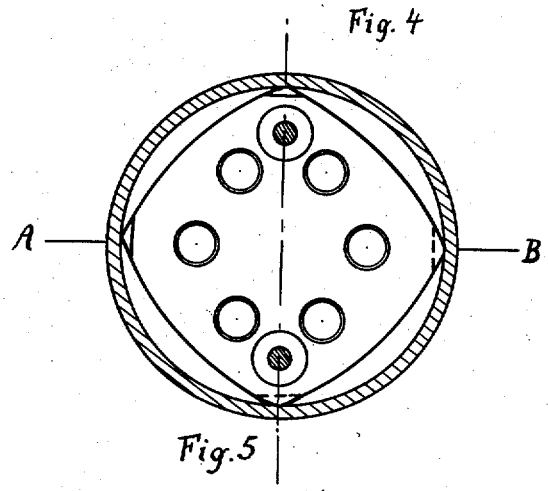
Fig. 5 is a cross-sectional view of Fig. 4.

Figs. 4 and 5 show a modified form of my heating element in which within the pipe 13 the heating conductors 14 are supported in spaced relation to each other and to the walls of the pipe by means of insulating elements 16. The insulating elements are retained in position by means of supporting wires 15. Each insulating element, note Fig. 5, is substantially quadrangular in section but has the sides thereof slightly curved outwardly. Two of the corners are cut off while the other corners are retained in order to provide point-like contacting surfaces with the wall of the tube 13. As shown in Fig. 4, the insulating elements are arranged one above the other so that the unbroken edges of the stones form in section a helical line. The two opposite flat surfaces of each insulating element are furthermore curved toward each other adjacent the edges of the insulating element so that the point-like surface of the corner is maintained and furthermore a greater degree of direct radiation from the heating conductors 14 to the walls of the pipe is obtained.

As shown in Fig. 6, this heating element may be also formed with the flat surfaces of the insulating element dished inwardly in order to reduce the size of the insulating element and to allow a greater direct degree of radiation from the heating resistance to the walls of the pipe. This figure further shows that one corner 18 is unbroken while the other corner 19 has been cut off. In Fig. 4 a flange is shown on each face of each insulating element for the purpose of strengthening the opening through which the supporting wires 15 extend.

The insulating elements 11, 16 and 17 may be molded from any type of insulating material. Preferably, ceramic material is used although soapstones or stones having even a denser mass may be used.

Fig. 7 shows a heating body in the shape of a ring 20 and being horizontally disposed in a heating bath. This ring is connected to the vertical tube 21, through which the supply conductors extend. The heating resistances 22 are of course placed within ring 20. Naturally a single heating resistance can be used in ring 20 as well as the plurality of resistances shown. The reservoir 23 may be surrounded by a heating wire. In such a case the inside walls of the reservoir 23 can be covered with a protective layer 24 formed of a material immune to corrosion. Furthermore, the outside walls of the reservoir 23 can be coated with such a material. Such protective layer of material may be of nickel and more especially of a nickel layer having a thickness of more than .08 mm. in order to prevent permeation of corrosive salts.

The heating body immersed within the bath is shown having a protecting layer 25 which may cover the actual heating element both on the inside and outside thereof. In this respect, the protection on the inside of the pipe has the advantage of preventing the permeation of salts from the walls of the tubes and at the same time protects the side of the wall facing the heating resistance per se from smouldering. Coverings of protective metal on both surfaces of the reservoir 23 have an advantage only if heating from the outside of the reservoir 23 is resorted to.

Having now disclosed the means by which I obtained the objects and advantages of my invention, what I claim is:

1. An electrical heating element for immersion heating of baths comprising a curved pipe having a conductor supported by spaced insulators extending therein, said insulators being substantially flat, and thin in section, and being formed with a plurality of corners which provide substantially point-like bearings for said insulators against the inside walls of said pipe.

2. An electrical heating element as in claim 1, in which said insulators are substantially rectangularly shaped, but have at least one corner removed, whereby the number of point-like bearings for each insulator is reduced.

3. A heating device for immersion heating of baths comprising a curved pipe and a flexible heating element movably arranged in said pipe, and consisting of a heating conductor and substantially flat insulating elements contacting said conductor, said elements being spaced from each other and supporting said heating conductor in spaced relation to the inner wall of the pipe, the maximum projected area of each of said insulating elements in the direction of the longitudinal axis of said pipe being less than the cross sectional area of the interior of said pipe on a plane lying normal to said axis and the bearing surfaces between said insulating elements and said wall being substantially fine areas of contact.

4. A heating element as in claim 3, successive insulating elements being angularly displaced about the axis of the pipe whereby the engaging portions of said insulating elements with said pipe are in staggered arrangement.

5. A heating element as in claim 3, said insulators being substantially polygonal in shape but having at least one corner thereof removed whereby the number of contact points of each insulating element is reduced.

6. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, at least one heating conductor passing through each of said insulating elements, the maximum projected area of each of said insulating elements in the direction of the longitudinal axis of said pipe being less than the cross sectional area of the interior of said pipe on a plane lying normal to said axis and the bearing surfaces between said insulating elements and said wall being substantially fine areas of contact.

7. A heating element for immersion heating of baths comprising a pipe having a single curve therein and being closed at one end, and a flexible heating element movably arranged in said pipe, said heating element consisting of at least two heating conductors and substantially flat insulating elements spaced from each other for maintaining the heating conductor spaced from each other and from said pipe, at least one heating conductor passing through each of said insulating elements, the maximum projected area of each of said insulating elements in the direction of the longitudinal axis of said pipe being less than the cross sectional area of the interior of said pipe on a plane lying normal to said axis and the bearing surfaces between said insulating elements and said wall being substantially fine areas of contact.

8. A heating element for immersion heating of baths comprising a curved pipe closed at one end, and a flexible heating element movably arranged in said pipe, said heating element consisting of at least two heating conductors and substantially flat insulating elements spaced from each other for maintaining the heating conductors spaced from each other and from said pipe, at least one heating conductor passing through each of said insulating elements, said insulating elements mounted on said conductors extending from the end of the heating conductors to a point below the level of a bath in which said heating element is adapted to be immersed, the maximum projected area of each of said insulating elements in the direction of the longitudinal axis of said pipe being less than the cross sectional area of the interior of said pipe on a plane lying normal to said axis and the bearing surfaces between said insulating elements and said wall being substantially fine areas of contact.

9. A heating element for immersion heating of baths comprising a pipe having a single curve therein and being closed at one end, and a flexible heating element movably arranged in said pipe, said heating element consisting of at least two heating conductors and substantially flat insulating elements spaced from each other for maintaining the heating conductors spaced from each other and from said pipe, and the maximum projected area of each of said insulating elements in the direction of the longitudinal axis of said pipe being less than the cross sectional area of the interior of said pipe on a plane lying normal to said axis, at least one heating conductor passing through each of said insulating elements, and at least one heating conductor passing through a space between an insulating element and the inner wall of the pipe.

10. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, said insulating elements being polygonal in shape with at least one corner removed, and at least one heating conductor passing through each of said insulating elements, successive insulating elements being angularly displaced about the axis of the pipe.

11. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, the maximum projected area of each of said insulating elements in the direction of the longitudinal axis of said pipe being less than the cross sectional area of the interior of said pipe on a plane lying normal to said axis, the bearing surfaces between said insulating elements and said wall being substantially fine areas of contact, at least one heating conductor passing through each of said insulating elements, and a supporting wire passing through said insulating elements.

12. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, the maximum projected area of each of said insulating elements in the direction of the longitudinal axis of said pipe being less than the cross sectional area of the interior of said pipe on a plane lying normal to said axis and the bearing surfaces between said insulating elements and said wall being substantially fine areas of contact, at least one heating conductor passing through each of said insulating elements, said heating conductors being adapted to and arranged to terminate in a heating bath below the surface thereof and said pipe to extend above the surface of the bath, and supply leads connected in said pipe with the heating conductors.

13. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, said insulating elements being in substantially point-like contact with the inner wall of said pipe, and at least one heating conductor passing through each of said insulating elements, said insulating elements being pointed toward the contact points.

14. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, said insulating elements being polygonal in shape with at least one corner removed and being in substantially point-like contact with the inner wall of said pipe, and at least one heating conductor passing through each of said insulating elements, said insulating elements being provided with cavities and pointed toward the contact points, the successive insulating elements being disposed at equal angles about the axis of the pipe.

15. A heating element for immersion heating of baths comprising a curved pipe and a flexible heating element movably arranged in said pipe, said heating element consisting of at least two heating conductors and substantially flat insulating elements spaced from each other for maintaining the heating conductors spaced from each other and from said pipe, said insulating elements being in substantially point-like contact with the inner wall of said pipe, and at least one heating conductor passing through each of said insulating elements, the successive insulators being disposed at equal angles about the axis of the pipe, the surface of the pipe being coated by a material resistant to the corrosive action of a melting bath, and said insulating elements being adapted and arranged to terminate in said bath below the surface thereof.

16. A flexible heating element for immersion heating of baths comprising a plurality of insulating elements having a plurality of conductors extending therethrough and supporting wires for holding said insulating elements in place, each of said insulating elements consisting of a substantially flat quadrangular body having two corners removed and having the opposite faces of said body tapered toward each other adjacent the edges of said body to form substantially line-like edges, openings in said body for the passage of said conductors and supporting wires therethrough, and flanges surrounding the openings through which said supporting wires extend, said flanges maintaining said insulating elements in spaced relation with respect to each other.

ALFRED KÄRCHER.